Dec. 10, 1929.   F. CONNOLLY   1,739,062
EGG COOKER
Filed Sept. 6, 1928
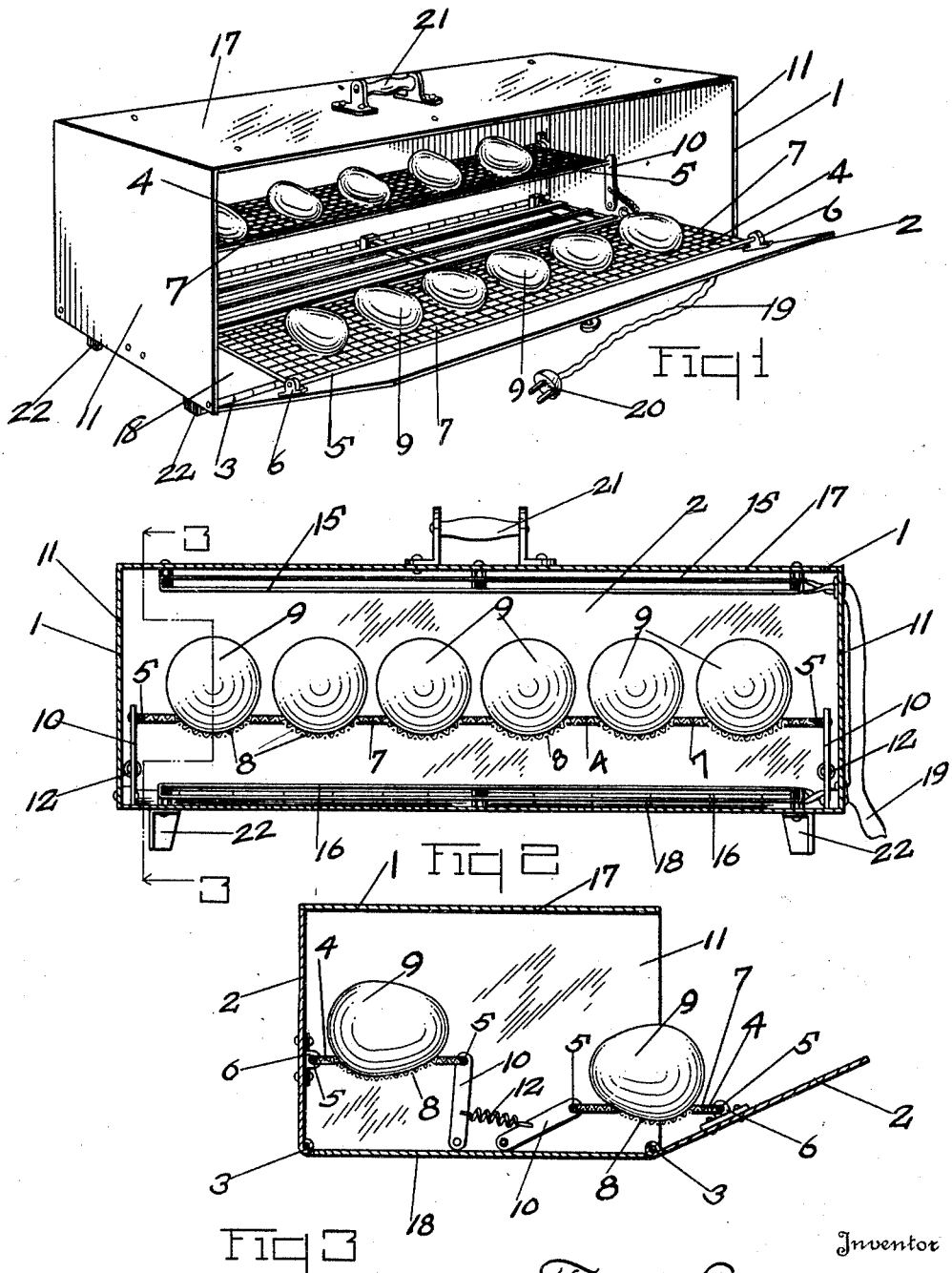
Inventor
Frank Connolly
By Faust F. Crampton
Attorney Patented Dec. 10, 1929

1,739,062

UNITED STATES PATENT OFFICE

FRANK CONNOLLY, OF TOLEDO, OHIO

EGG COOKER

Application filed September 6, 1928. Serial No. 304,241.

My invention has for its object to provide an exceedingly efficient egg cooker that is particularly adapted for cooking unbroken eggs and whereby a slow heat may be applied to heat the eggs uniformly throughout and raise their temperature uniformly throughout, and to produce a uniform jelly-like consistency in the white and yolk substantially the same as that produced in well coddled eggs. The invention particularly provides a means for supporting the eggs between electric heat elements at a point sufficiently remote therefrom as to produce a uniform temperature at the shell and which is so constructed that it may be readily shifted to and from the heating position and the position of placement or removal of the eggs therefrom.

The invention may be contained in structures of different forms and, to illustrate a practical application of the invention, I have selected an egg cooker containing the invention as an example of such structures and shall describe it hereinafter. The structure selected is shown in the accompanying drawing.

Fig. 1 illustrates a perspective view of the cooker, one of the doors of the cooker being shown open. Fig. 2 is a view of a longitudinal section of the cooker. Fig. 3 is a view of a section taken on the plane of the line 3—3 indicated in Fig. 2.

In the form of construction shown in the drawings, the cooker comprises a shell 1 having two doors 2, that form the side walls of the shell 1. The doors 2 are hingedly connected to the bottom of the shell as at 3. The cooker is provided with a pair of shelves 4 that are hingedly connected to the doors 2, preferably at a point substantially mid-way between the upper and lower edges of the door. Each shelf 4 is formed of a frame 5 that is pivotally supported in ears 6 that are secured to the inside of each door. A screen 7 of fine wire mesh extends across the sides of the frame 5 and are secured thereto. The screen 7 is indented, as at 8, to conform to the lower sides of the eggs 9 that may be placed on each shelf.

A pair of arms 10 are pivotally connected to the end walls 11 of the shell 1 and also pivotally connected to the frame 5. The length of the arms 10 are such as to locate each shelf 4 in a horizontal position when the door 2, to which the shelf is connected, is closed. Since each arm 10 has a length that is substantially equal to the height of the point of connection of the shelf 4 with the door, above the bottom of the shell, the shelf 4 will be located in a horizontal position, that is, parallel with the bottom of the shell when the door is open. When the door is opened, the shelf will be drawn outward through the opening formed by the door which locates the shelf in position so that the eggs may be readily placed thereon. The wire screen 7 of the shelves affords a cushion for receiving the eggs. They also permit the radiant heat to readily pass to the eggs from points beneath the shelves 4. The indented portions 8 maintain the eggs in position, particularly in the manipulation of the doors and shifting the shelves.

In order to provide a means for maintaining the doors closed, the arms 10, pivoted to each end wall 11, are connected together by means of springs 12 so that when either door is opened or, if desired, both doors are opened, the springs 12 will resiliently operate to close the doors and locate the shelves in proper relation to the heating elements.

The heating elements 15 and 16 are supported on the top and bottom walls 17 and 18 and are electrically connected to a source of supply through a connecting wire 19 and the usual connecting plug 20.

When it is desired to cook eggs, the doors are opened and the eggs are placed in position on the shelves 4 whereupon the doors are closed which raise the eggs to a point that is substantially mid-way between the electric heat units 15 and 16. The shell 1 is made with a height so as to locate the eggs about midway between the two heat units 15 and 16 and also spaced therefrom sufficiently to produce a substantially uniform temperature throughout the entire surface of each egg. This operates to uniformly and, comparatively, slowly heat the eggs whereby the entire body of each egg will be uniformly heated. The eggs are left within the cooker a length of time required to produce a substantial jelly-like condition throughout each egg.

The top of the shell 1 may be provided with a suitable handle 21. The bottom may be provided with suitable feet 22 in order to protect any surface, on which the cooker may be placed, against the heat, particularly from the lower heat element 16.

I claim:

1. In an egg cooker, a shell having a pair of doors forming when closed the side walls of the shell and hingedly connected to the bottom wall of the shell, electric heat units located near the top and bottom walls of the shell, shelves hingedly connected to the doors substantially mid-way the height of the doors, a pair of arms pivotally connected to the end walls near the bottom wall of the shell and to the inner edge of each shelf to maintain the shelf substantially parallel to the bottom wall when the door is opened, and springs interconnecting the arms connected to each end wall.

2. In an egg cooker, a shell having a pair of doors forming when closed the side walls of the shell and hingedly connected to the bottom wall of the shell, electric heat units located near the top and bottom walls of the shell, frames hingedly connected to the doors substantially mid-way the height of the doors, the frames having wire screens extending across the frames and having indented portions, a pair of arms having lengths substantially one-half the height of the doors and pivotally connected at their lower ends to the end walls and to the ends of the frames, springs interconnecting the arms connected to opposite doors for elastically closing the doors and drawing the frames within the cooker.

In witness whereof I have hereunto signed my name to this specification.

FRANK CONNOLLY.